Patented Oct. 10, 1939

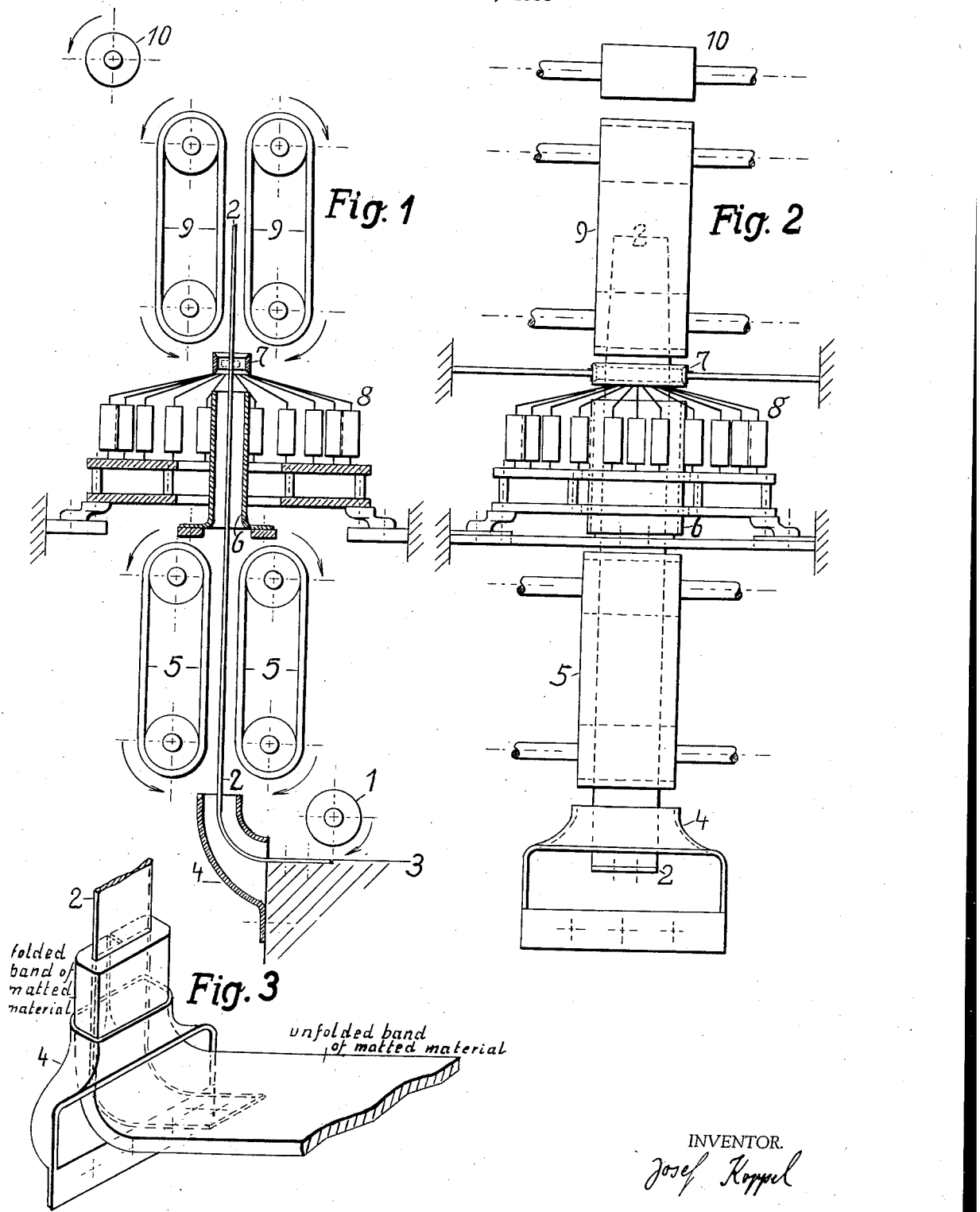

2,175,401

UNITED STATES PATENT OFFICE 2,175,401

BRAIDING MACHINE

Josef Koppel, Westwood, N. J.

Application October 11, 1938, Serial No. 234,340

3 Claims. (Cl. 96—3)

My invention relates to an improvement in the braiding of threads around a continuous folded band of soft materials for upholstering purposes. It can apply to all soft materials regardless of width and thickness of the finished product.

I attain this object by the mechanism illustrated in the accompanying drawing in which Figure 1 is the vertical section of the entire machine. Figure 2 is the side view of the entire machine, as it appears after the removal of cylinder 1 and table 3. Figure 3 is the perspective view of the guide opening 4.

Description of working process

The cylinder 1 pushes the band of raw material, which is twice the width of the finished product, through a guide opening 4 which guides and folds the raw material over the plate 2. Two continuous leather belts 5 grip the material and push it through a second guide opening 6, leading it to a third guide opening where the braiding of the threads around the soft folded material is begun 7. Two additional continuous leather belts 9 grip the braided material, removing it from the plate 2, and completing the process. Roll 10 leads off the finished product.

Detailed description of parts

The plate 2 is attached to a table 3. This is the only attachment for this plate 2. The plate 2 is held in place by the pressure created by the leather belts 5 and 9 upon the folded band of material as it passes along the plate 2 from bottom to top. Simultaneously the plate 2 forms the base for the braiding of the threads around the folded material. The plate 2 has a slightly tapered form on the top to facilitate the removal of the finished product. The plate 2 is the most important part of the machine due to the fact that without it, the soft material could not be folded and held in shape throughout the braiding process.

The braiding section 8 is the usual type of braiding machine.

I claim:

1. In combination with a machine for braiding threads about the surface of a matted material, a thin, flexible mandrel extending axially through the machine and anchored at one of its ends to a stationary support, means for introducing the matted material to the machine for being braided thereby in folded condition about said mandrel, and means for withdrawing the braided material from the end of said mandrel opposite its anchored end.

2. In combination with a machine for braiding threads about the surface of a matted material, a thin, flexible mandrel extending centrally through the machine and fixed at one of its ends against lengthwise movement relatively thereto, means for feeding the matted material in folded condition about said mandrel to the machine for being braided thereby, and means for ejecting the material from said other end of said mandrel after the material has been braided by the machine.

3. In combination with a machine for braiding threads about the surface of a matted material, a thin, flexible mandrel extending axially through the machine and fixed against lengthwise movement relatively thereto, a pair of feed belts arranged on opposite sides of said mandrel on one side of the machine for feeding the material in folded condition about said mandrel to the machine to be braided thereby, and a pair of ejector belts arranged on opposite sides of said mandrel on the opposite side of the machine for ejecting the braided material from said mandrel.

JOSEF KOPPEL.